United States Patent [19]

O'Rourke

[11] 4,003,263
[45] Jan. 18, 1977

[54] TUBE PROFILE GAGE

[76] Inventor: John E. O'Rourke, Contra Costa County, Moraga, Calif. 94556

[22] Filed: Jan. 14, 1976

[21] Appl. No.: 649,068

Related U.S. Application Data

[63] Continuation-in-part of Ser. No. 471,446, May 20, 1974, abandoned.

[52] U.S. Cl. .............................. 73/432 HA; 33/1 H; 33/125 B
[51] Int. Cl.$^2$ .......................................... G01C 5/04
[58] Field of Search ......... 73/401, 432 HA; 33/1 R, 33/1 H, 125 B, 367

[56] References Cited

UNITED STATES PATENTS

| | | | |
|---|---|---|---|
| 3,538,608 | 11/1970 | Bronson | 33/125 B X |
| 3,561,127 | 2/1971 | DuBose | 33/367 |
| 3,949,484 | 4/1976 | Cluley et al. | 33/367 |

Primary Examiner—Richard C. Queisser
Assistant Examiner—John S. Appleman

[57] ABSTRACT

To measure compressions and settlements in the foundations of heavy structures, a continuous loop of tubing is installed within the foundation of the structure, with the open ends of the loop brought to a convenient, accessible terminal point. A liquid interface between a heavy density fluid and a light density fluid is moved through the tubing, the particular fluid on either side of the interface being continuous back to the terminal. The pressure difference resulting from the difference in densities of the two fluids, and the changes in height between the fluid interface within the tubing and the constant upper surface of the driving heavy density fluid in the terminal, is sensed by a pressure transducer fitted within the terminal to the light density fluid in the discharge leg of the loop. The output of the pressure transducer is connected to a commercial strip chart recorder to obtain a scale plot of the existing relative elevation profile of the tubing within the structure's foundation, referenced to the absolute elevation of the constant upper surface of the heavy density fluid in the terminal. By periodic operation of the fluids through the tubing loop, in conjunction with a check of the absolute elevation of the terminal by other means, such as surveys, the time-related settlement of the foundation under the structural load may be monitored.

5 Claims, 3 Drawing Figures

TUBE PROFILE GAGE

APPLICATION REFERENCE NOTE

The following specifications and referenced drawings are a continuation-in-part of application Ser. No. 471,446, filed May 20, 1974 abandoned.

BACKGROUND OF THE INVENTION

Structures built on earth foundations cause compression and settlement of the underlying soil. Such compression and settlements may continue for a long time after such a foundation is loaded by the overlying weight of the structure. The total magnitude of settlement, and the time duration of any significant settlement, are usually very important to the proper design, construction, and performance of most important engineered structures.

It is sometimes possible to improve the load carrying characteristics of a foundation site by pre-loading the site with a height of added soil that is equivilent in weight to the proposed structure for the site, commonly referred to as surcharging the site. In such a case it is necessary for the foundation design engineer to monitor the time-rate results of settlement beneath the surcharge in order to compare actual with predicted results, and so finally to verify that all significant compressions to be expected under the proposed permanent structure have already taken place.

In order to monitor settlements beneath such surcharges, it has been common practise to place flat steel plates on the existing ground surface at numerous points around the site, and to extend pipes, connected at the bottom to the plates, up through the surcharge, as it is placed by heavy, earth-moving equipment. By keeping track of the precise length of pipe added above the plates, and by having survey crews establish the elevation of the upper, exposed end of the pipes from time to time during construction of the surcharge and thereafter, the elevation of the buried plate, and hence the time-rate settlement of the ground surface may be determined.

Some of the shortcomings of such a system have been the risk of damage and loss to the settlement plate riser pipe by the earth-moving equipment, the increased costs of placing the surcharge due to interference of the pipes with free movement of the equipment, the costs for the two or three man survey crew necessary to add additional pipe lengths as the surcharge to the top of each pipe to determine the settlement of the plate, the limited number of settlement plates that can be accomodated on the average job, and the numerous occasions for accidental data errors.

The advantages of the instant invention over the prior method is that it may be installed in shallow trenches in the existing ground surface before surcharge construction begins; it may be operated thereafter for settlement observations with no interference whatsoever to the surcharge construction; it may be operated by one man, with no attention to the system necessary in the interval of time between sets of observations; it provides a more comprehensive evaluation of the complete settlement profile beneath the surcharge than is possible with earlier methods which monitored a very limited number of discreet points within the site.

Another ideal application of the instant invention is in the observation of compressions and settlements both beneath and within earth-fill dams, used to impound water in reservoirs. Such earth-fill dams are commonly constructed of several zones of soil of different properties. Commonly at least one zone comprises the principal seepage barrier to the water impounded on the upstream side of the dam, while outer, coarser zones of soil or rock provide the necessary strength against rupture of the embankment, due to pressure of the water, or other disturbing forces such as earthquakes. Usually, a free-draining zone is found to be necessary near the downstream face of the seepage barrier zone in order to remove the small amount of seepage that is unavoidable, and to conduct it safely and quickly from the dam before it can saturate and weaken the downstream zone(s) responsible for maintaining stability only.

Foundation settlements that are severe in total magnitude, and particularly where they vary abruptly across the base of the dam, that is, severe differential settlement, may cause cracking or shearing of the overlying, heavily compacted earth-fill zones comprising the dam. Such cracking can lead to failure of the dam, through excessive seepage past the seepage barrier, offseting and blinding of sections in the free-draining zones, and weakening of the stability zones.

The instant invention may be employed in the foundation of the dam before construction begins, and again at several higher levels in the embankment above. The only time the system must be protected from other construction activities is during the actual installation period of one to several days, depending on the total length of system desired at any level. Thereafter, the system is operated without interference to dam construction, and the compressions and settlements in the foundation and within the embankment are monitored to determine whether they are in the expected tolerances for the dam. Various remedial measures are available to the engineer in case he believes the tolerances are being exceeded, including such steps as slowing the rate of construction, altering grading and moisture content of the various zones, and altering dimensions of the zones.

The instant invention is also convenient for installation beneath, or within a large, interconnected complex of buildings, such as in heavy industrial plants, nuclear and fossil fueled power generating plants, and levees and canal superstructures. Such buildings usually afford some degree of access to the usual survey crews, operating with geodetic levels and rods, to monitor visible points on the outside walls. However, here again such access may be objectionable and limited, and may be more costly than use of the instant invention.

SUMMARY OF THE INVENTION

A system for measurement of vertical deflections along a continuous closed-loop path beneath or within a structure built on a compressible foundation is provided by installing a continuous loop of tubing along the required path of investigation, either in trenches beneath the structure, or embedded directly in the materials of the structure, such as in compacted earth embankments or in concrete, or on semiaccessible surfaces of the structure, such as in tunnels. A hydraulic control and pressure measurement apparatus is used to fill the tubing with a light density fluid such as water from a convenient point of access to the open end of the loop, usually somewhere outside the construction. The apparatus is then operated to cause a continuous flow of a heavy density fluid, such as mercury, into one end of the loop, pushing the water out of the other end. The pressure at the interface between the mercury and the water is sensed by a pressure transducer in continuous contact with the water flowing out of one end of the loop. The hydraulic control apparatus has means of continuously maintaining a free, upper level of the continuous column of the mercury down to the interface with the water in the tubing, thus making the change of pressure at the interface a function of the elevation of the tubing at the sequential observation points along the installed path of the tubing. The position of the interface, and hence the location of the elevation data point is determined by the cummulative volumetric measurement of the water displaced from the tubing loop by the advance of the mercury from the control terminal to the respective points; or the actual scaled plot of the existing elevation versus distance profile of the tubing is obtained by connecting a commercial strip chart recorder to the pressure transducer and running the chart recording speed at a standard, precise relationship to the speed of a set constant interface velocity through the tubing. Small local rises in the elevation of the tubing are provided during installation, in order to produce visual check points in the pressure plot on the strip chart recording, as a means of verifying the horizontal distance control for the data, as well as the vertical calibration to convert pressure change to elevation change for the data.

DESCRIPTION OF THE INSTANT INVENTION PREFERRED EMBODIMENTS

Figures 1, 2:
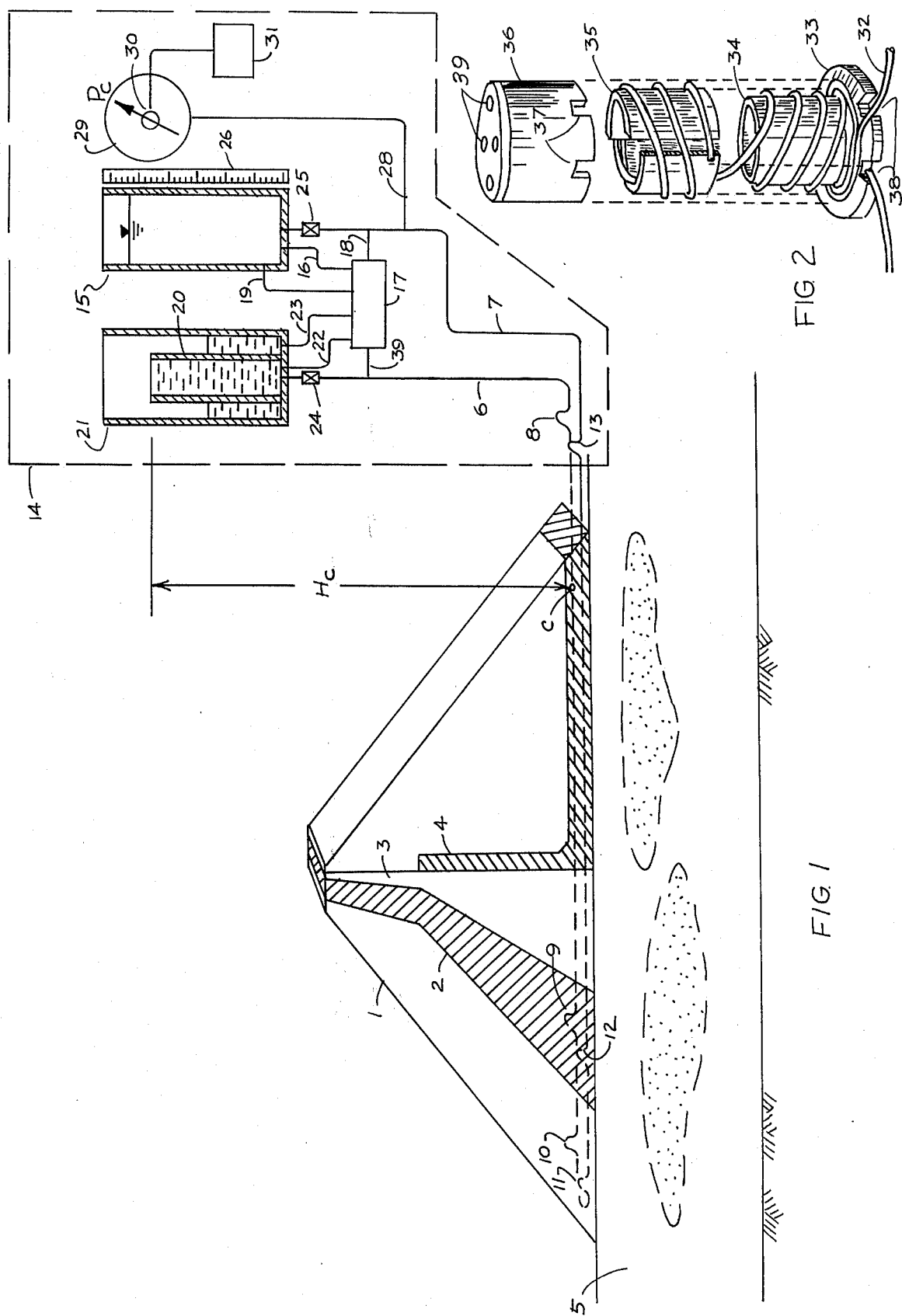
FIG. 1 is a cross section view of an earth-fill dam and it's compressible soil foundation, with a schematic diagram showing the instant invention to measure settlements beneath the dam.
FIG. 2 is a perspective view of a calibrating device useful with the instant invention.

Reference is now made to the several figures for a detailed description of the tube profile gage. FIG. 1 shows a schematic presentation of the component parts of the tube profile gage in relation to the cross-section of a zoned, earth-fill dam embankment, constructed over compressible river channel alluvium deposits, for which the tube profile gage is employed beneath the entire zoned cross-section, comprising the outer shell zone 1, the thin impervious core zone 2, a transition zone 3, and a drainage zone 4, including vertical chimney and horizontal blanket components. The various zones can only tolerate a limited amount and rate per unit horizontal distance of foundation settlement before the structural stability and hydraulic performance of the dam may become impaired, through cracking or shearing in the zones.

To monitor performance of the embankment during construction and later reservoir operation, a flexible conduit measurement traverse, preferably of 3/16-inch O.D. plastic tubing, and comprising inlet leg 6 and outlet leg 7, is embedded in shallow trenches excavated in the dam foundation before construction begins. Local, precise rises of several inches in elevation are introduced into the measurement loop at several points along its traverse, such as 8 through 13, by winding the tubing onto the exterior of small plastic pipe section calibrating spools. The plastic tubing and vertical calibration risers are sandwiched in fine sand or clay backfill in the bottom of the trenches, followed by random material from the trench excavation, until the ground is again level above the installed measurement loop. The ends of the installed measurement loop are brought into a terminal box, 14, mounted flush with the top of the ground surface, at the downstream slope of the dam.

The elevation of the terminal box is determined from time to time by geodetic surveys from elevation benchmarks outside the area of influence of dam construction, to provide an absolute reference for the elevation measurements to be made from the terminal, along the embedded measurement loop. The principal components of the portable tube profile gage readout cabinet are shown schematically within the outline of the terminal box. A description of preferred operation with principal components follows; wherein mercury serves as the heavy density fluid, and water as the light density fluid. Water is introduced into reservoir 15, and thence through conduit 16 to the hydraulic power and switching manifold (or P.S. manifold), 17. By manually setting values on the P.S. manifold to the system flush mode, the manifold pumps water through conduit 18 into leg 7 of the measurement traverse. Flow continues through the loop, back through leg 6, conduit 39, and thence back through the P.S. manifold and conduit 19 into reservoir 15. When all air has been excavated from the system and the measurement loop is completely filled with water, values on the P.S. manifold are switched to the operating mode. Open top cylinder tank 20 in reservoir 21 is then filled to overflowing with mercury. During the operating mode, P.S. manifold 17 continually recirculates mercury from the sump portion of reservoir 21 through suction conduit 23, thence through discharge conduit 22 into cylinder 20.

To perform profile measurements in the embedded traverse by the manual mode of operation, valve 24 is opened, allowing mercury to move into contact with water in leg 6 of the measurement traverse. The interface between mercury and water is advanced into leg 6 by manually opening and closing valve 25. In a preferred mode of operation, the equipment operator advances the interface by 10 foot increments into the measurement traverse tubing. As valve 25 is opened, water is pushed out of the measurement traverse and into the water reservoir by the advancing mercury, and the incremental distance of advance is noted on the calibrated scale 26 shown next to the water reservoir. Assuming the interface to have reached point C in leg 6, as soon as valve 25 is closed the pressure due to height $H_c$ of mercury is transmitted through the remaining water-filled tubing of leg 6, leg 7, and through connecting tube 28 to the pressure gage 29 where the operator observes a reading of $P_c$ on the gage. The following relationship applies:

$$W_m H_c - W_w H_c = P_c$$

where $W_m$ = density of mercury, and $W_w$ = density of water. If the gage is calibrated in standard inches of mercury, as preferred, $P_c$ will be read as some value, $R_c$. Then the following relationship holds:

$$H_c = [W_m/(W_m-W_w)]R_c$$

Moreover, as ambient temperatures, barometric pressures, and dissolved gases have small influences on the density of the fluids and performance of the pressure gage in the field, the tube profile gage is ordinarily calibrated in the field before each use, by lifting a portion of the tube containing the static mercury-water interface through 1 inch increments of vertical displacement within the terminal box location before advancing the interface out into the measurement traverse. The corresponding pressure gage readings are then used to obtain the calibration correction constant in the following equation:

$$H_c = 0 \ K[W_m/(W_m - W_w)]R_c$$

Now the operator advances the interface throughout the measurement traverse in 10 foot or greater increments of distance, obtaining a sufficient number of data points to accurately plot the elevation of the entire profile of the embedded measurement traverse relative to some fixed reference point for the tubing on the floor of the terminal. Since the true elevation of the reference point may be checked at any time by geodetic surveys as mentioned, the true elevation of the measurement loop profile may also be plotted from the known elevation of the reference point.

An automatic mode of operation is preferred where measurement loop elevation gradients are steep, either due to original construction requirements, or through severe differential settlements along the traverse following construction of the overlying works, or because of very long measurement traverse distances. A preferred embodiment is shown by the coupling of an electrically operated rotary potentiometer 30, to the shaft of the pressure gage needle. The rotary potentiometer will track the angular displacement of the pressure gage needle, and hence the interface pressure. In the event that the tube profile gage would only be operated in the automatic mode of operation at any job, the Bourdon tube type pressure gage could be dispensed with and parts 29 and 30 could be replaced by a single light density fluid-activated pressure transducer. For the preferred embodiment shown, the taps from the rotary potentiometer 30 are brought out to a standard commercial, electrically operated, strip chart recorder, 31.

By means of a suitable selector switch on the recorder unit, the chart is set to run at a suitable speed in relation to the speed of the moving interface in the measurement traverse; 1 inch per minute chart speed and 5 feet per minute interface speed are preferred, giving a 5 foot length of elevation profile for every 1 inch travel on the strip chart. Electrical output of the potentiometer, which is proportional to the interface pressure, deflects an ink pen trace on the strip chart at an orthogonal direction to the chart travel, thereby producing the elevation versus horizontal distance scale drawing of the measurement loop profile.

In the automatic mode of operation, there are pressure head losses due to fluid flow. The velocity of flow is the principal factor and a constant in velocity head at any point in the measurement traverse from one set of observations to another, facilitates data comparison, and can be achieved with a commercial flow control valve. In order to demonstrate repeatability, and to realize accuracies in the measurement traverse profile to within ¼ inch of true elevation, it is preferable to install small vertical calibration risers at selected points along the measurement traverse. A preferred embodiment of calibration riser is shown in FIG. 2.

The standard plastic 3/16-inch outside diameter (O.D.) measurement loop tubing is brought onto a flat 4 inch diameter plastic disc 33 where it is coiled flat over a length of about 30 inches and then brought up around a 2 inch inside diameter (I.D.) plastic pipe section 34 on a 1 in 10 slope, whereupon a split plastic pipe section of 3 inch I.D. is slipped over the previously coiled rise of tubing, and the leading edge of the coiled tubing is brought out from the inside of the split pipe section over a recessed 3/16-inch lip on the top edge of the latter, and thence down on a 1 in 10 slope around the outside of the split section pipe to the level of the base disc 33. Thereafter, a 4 inch I.D. plastic pipe sleeve with end cap 36, is slipped down over the concentrically layered tubing and pipe sections and positioned so that the measurement loop tubing enters and exits through slots 37 directly over soil strain relief cutouts 38, in the plastic disc base.

The strain relief cutouts minimize the danger of the measurement loop tubing shearing off from the vertical calibration riser due to differential soil movements around the riser. The entire vertical calibration riser is then potted with epoxy-resin through holes 39.

Since the vertical rise of the tubing in the calibration riser is precisely known, the resultant deflection of the strip chart recorder pen as the interface passes through the riser is precisely calibrated to a known standard at the relevant location along the measurement loop. This calibration is always applied to the deflection from the strip chart datum line to the trace for the 30 inch level section of tubing on the calibration riser base. Comparison of the resultant difference in elevation from the datum to the riser base from one set of observations to the other gives the true incremental settlement of the riser. Settlement of measurement loop tubing between calibration risers is preferably determined by taking the average of the calibrations of the risers at either end, but may be more precisely determined by noting over a period of operation the change in calibration per unit of settlement in the riser at either end, and thereby deriving a calibration to match the apparent settlement of measurement loop at the exact point in question. Calculation by successive approximations yields the true settlement to within the system accuracy of ¼ inch. The horizontal scale on the recorders strip chart is preferably checked against the geodetic surveyed distances of each calibration riser from the terminal, made at the time of installation, and the strip chart scale is conformed if necessary.

Figure 3:
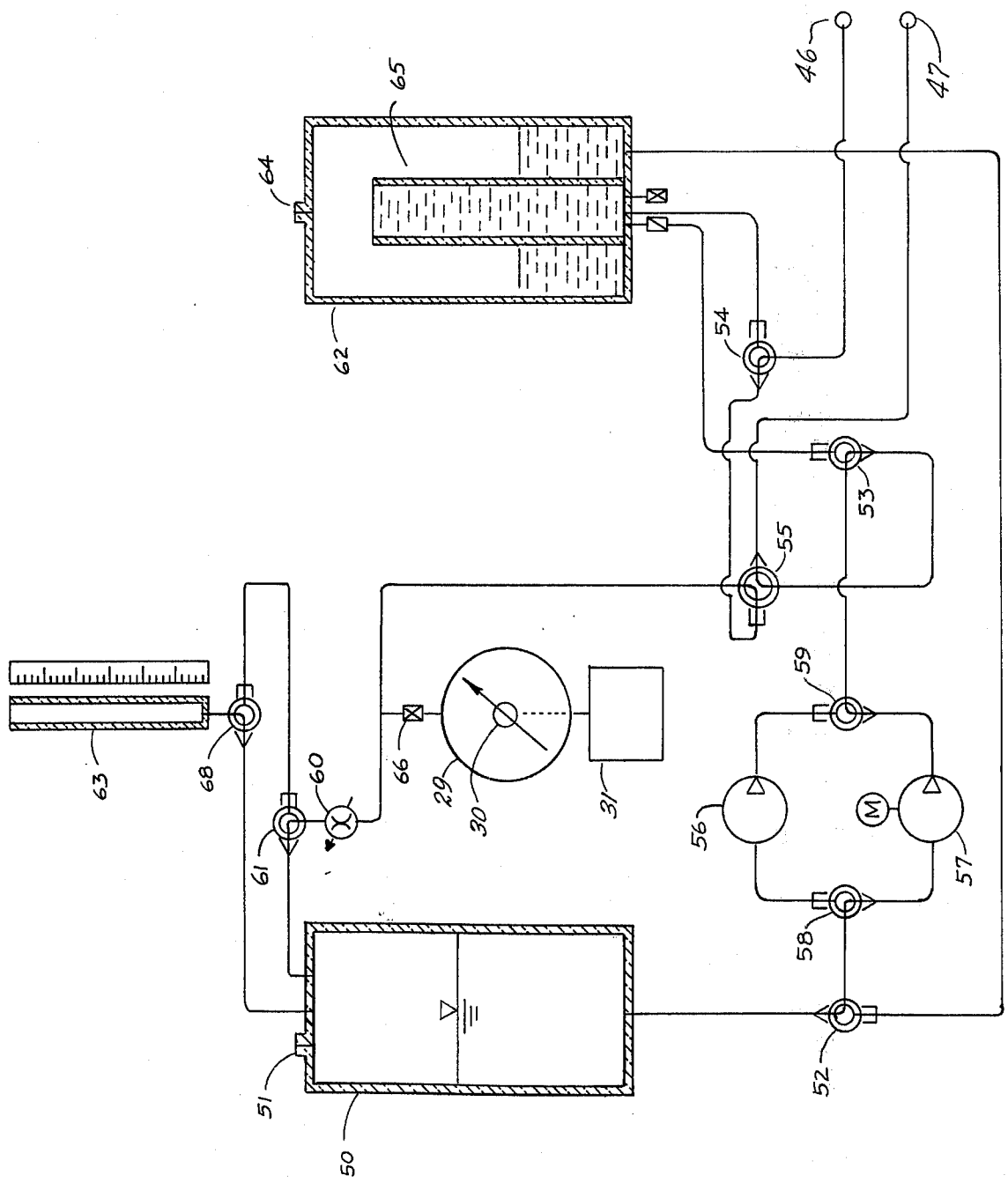
FIG. 3 is a side elevation view of a typical apparatus constructed in accordance with the instant invention for measuring settlements.

FIG. 3 will illustrate a preferred embodiment of components in a P.S. manifold, to suit the schematic operation already described in FIG. 1, along with other principal components comprising a tube profile gage readout in a portable cabinet. Water is introduced into water reservoir 50 through port 51. For flushing our air and filling the system with water, three-way switching valves 52, 53, and 54 and four-way switching valve 55 are turned as shown. The three-way switching valves are commercial stainless steel ball valves which connect either of two in-line ports with a third orthogonal port. The alternate in-line port is connected to the orthogonal port by rotating the valve handle, and hence the internal flow ball, 180°. The four-way switching valve is also a stainless steel ball valve, which connects pairs of adjacent ports to form two independent flow paths through the valve. A 90° turn of the valve handle selects the next alternate two flow paths through the valve. Either manual pump 56 or electric pump 57 may now be selected for the operation. In FIG. 3, three-way valves 58 and 59 have been turned to select the electric pump. Micrometering flow valve 60 is opened wide; and three-way valve 61 is turned to the position shown, connecting valve 60 directly to water reservoir 50.

The pump is started and water will flow from the reservoir, through the pump, out to the measurement traverse at connection 47, back from the measurement traverse through connection 46, thence back to the water reservoir. After all air has been removed from the flow lines, it is preferred that three-way valve 54 be momentarily switched 180° to fill the connected tubing up to mercury reservoir 62 with water.

Similarly, valve 61 is switched 180° momentarily, to fill the connected tubing up to the volume measurement burette 63, a glass tube calibrated in equivilent 1 foot increments of measurement traverse internal liquid volume.

After the system has been satisfactorily flushed and filled with water, the pump is turned off. Mercury is poured into mercury reservoir 62 through port 64. Inner cylinder 65 is filled to overflowing, and mercury sufficient to fill the measurement traverse is allowed to rise in the annular sump space of reservoir 62, outside cylinder 65. Micrometering valve 60 is now throttled down to the proper setting for a 5 foot per minute advance of mercury-water interface in the measurement loop, and toggle valve 66 is opened to connect the Bourdon tube pressure gage 29 to the measurement loop. All other valves are assumed still in their former flushing position.

To commence the profile measurement operation, three-way valve 61 is turned 90° to a no-flow, or off position, thus blocking return of water from the measurement traverse to the water reservoir. Three-way valves 52 and 53 are turned 180°, and the electric pump is restarted. The pump will now draw mercury from the sump of mercury reservoir 62 and pump it into inner cylinder, constant depth tank 65 whence it continually overflows back to the sump. The small volume of water that was in the pump lines will merely collect on top of the sump mercury to no effect.

Three-way valve 54 is now rotated 180°, bringing the mercury of inner cylinder 65 into contact with the water at the mercury reservoir end of the measurement traverse. Advance of mercury into the measurement traverse cannot yet take place, owing to the closed position of three-way valve 61 at the other end of the traverse.

To begin the manual mode of measurement traverse operation, three-way valve 61 is turned 90° to direct flow from the measurement traverse toward the volume measurement burette 63. Three-way valve 68 is then turned to allow flow from the measurement traverse into the burette. Mercury will now advance out of inner cylinder 65 into the measurement traverse, pushing water out of the measurement traverse at the other end, and into the volume measurement burette. Mercury that enters the measurement traverse from inner cylinder 65 is continually replaced from the sump volume by the pump. Since the pump flow into inner cylinder 65 is always greater than the flow out into the measurement traverse, cylinder 65 always remains full to overflowing during operation of the gage.

When the operator notes that the interface has advanced a suitable distance into the measurement traverse as observed on the distance calibrated burette, three-way valve 68 is turned 90° to a closed position, and the pressure on gage 29 is observed and recorded. Valve 68 is then turned an additional 90° to allow the water to flow out of the burette 63 and into reservoir 50, until the surface of the water in the burette descends to the zero reference line of the burette. Thereupon, valve 68 is switched 180° to allow water from the measurement traverse to again flow into the burette, and the mercury-water interface in the measurement loop moves onto the next data point in the measurement traverse.

To operate the gage in the automatic mode, three-way valve 61 is switched to direct flow from micrometering flow valve 60 into the water reservoir instead of to the volume measurement burette. Then the mercury from inner cylinder 65 advances continuously into the measurement traverse at a rate controlled only by micrometering flow valve 60. The pressure variation of the continuously moving mercury-water interface in the measurement traverse is tracked by electric rotary potentiometer 30, fixed to the needle shaft pressure gage 29. The output of the potentiometer is recorded on strip chart recorder 31, as described in the discussion of FIG. 1.

I claim:

1. A tube profile gage for measurement of vertical settlement or vertical heave throughout the length of a conduit affixed to, or located within or beneath any civil works, such as structures, dams, or terrestrial formations; including land slides, or subsiding ground surfaces, said gage comprising a measurement traverse of a conduit along the required route of observation for vertical movement of the works, such conduit being of flexible, pressure tight construction, with the ends of the measurement traverse conduit brought to some convenient, accessible terminal location relative to the works, for connection to readout cabinet, with means in the cabinet of flushing and completely filling the said measurement traverse with a light density fluid, with further means of then introducing a heavy density fluid from the cabinet into one end of the measurement traverse, with further means in the cabinet of regulating the rate and duration of advance of the heavy density fluid into the measurement traverse and the light density fluid out of the measurement traverse, with means of determining the distance of travel of the heavy density/light density fluid interface into the measurement traverse, with further means of continuously maintaining a surface level of heavy density fluid in the cabinet at a constant reference elevation irrespective of the amount of heavy density fluid supplied from the cabinet into the measurement traverse, with means of determining the hydrostatic pressure resulting from the vertical position of the heavy density/light density fluid interface with respect to the constant elevation of the said surface of the heavy density fluid in the cabinet, and thereby discovering the true vertical distance between the said fluid interface and the known elevation of the surface of the heavy density fluid in the cabinet, with further means of automatically recording and calibrating the hydrodynamic pressure variation produced by a continuously moving fluid interface, at a recording time rate proportional to the rate of travel of the fluid interface through the measurement traverse, thereby producing the digital data or actual scaled drawing of the existing elevation profile for the measurement traverse, which may be compared with earlier elevation profiles to discern the vertical movement which has occurred in the appurtenant works, to-date.

2. A tube profile gage as defined in claim 1 wherein said means in the cabinet of completely filling the measurement traverse with a light density fluid is comprised of a storage reservoir of the light density fluid, communicating through a switching valve to a selector valve for either a powered fluid pump or a handoperated fluid pump, thence through the selected type of pump to switching valves controlling access to the measurement traverse through the works, thence through the said measurement traverse, thence through switching valves and a flow regulating valve controlling access back to an intake port in the light density fluid storage reservoir.

3. A tube profile gage as defined in claim 2 wherein said means of introducing a heavy density fluid from the cabinet into one end of the measurement traverse, with means in the cabinet of regulating the rate and duration of advance of the heavy density fluid into the measurement traverse, and the light density fluid out ot the measurement traverse, is comprised of a constant depth, heavy density fluid tank, communicating through a switching valve to the measurement traverse through the works, wherein upon opening of the said switching valve to bring the heavy density fluid in the constant depth tank to bear on the light density fluid in the measurement traverse, and opening the switching valves and flow regulating valve at the other end of the measurement traverse, controlling discharge of the light density fluid back into the intake side of the light density fluid storage reservoir, causes the heavy density fluid to advance into the measurement traverse at a controlled rate of advance, and wherein the duration of advance is regulated by closing the switching valves controlling the discharge of the light density fluid back into the intake side of the light density fluid storage reservoir.

4. A tube profile gage as defined in claim 3, wherein said means of continuously maintaining a surface level of the heavy density fluid in the cabinet at a constant, reference elevation irrespective of the amount of heavy density fluid supplied from the cabinet into the measurement traverse, is comprised of a 2 tank reservoir, wherein one tank is maintained in an overflowing, constant depth condition, and the other tank functions as a communicating sump to the former, and wherein an inlet and outlet port are fitted into the base area of the said constant depth tank and wherein the inlet port is connected through appropriate hydraulic flow control conduit, check valve, and switching valves, to a heavy-density liquid pump, which maintains the constant depth tank to overflowing with the heavy-density fluid, and wherein the outlet port connects the constant depth tank, through hydraulic tubing and switching valves, to the tube profile gage measurement traverse, and permits a fractional portion of the heavy-density fluid pump's supply to the constant depth tank to be fed, under the fixed reference head maintained in the overflowing constant depth tank, into the measurement traverse, while excess heavy-density fluid which overflows from the constant depth tank is communicated to, and collected in, the sump tank, and is recirculated back to the pump through a port and connecting hydraulic tubing and switching valves described, thus maintaining by an appropriate setting of the switching valves described, a constant surface level of the heavy-density fluid, at the overflow level of the constant depth tank, irrespective of the amount of heavy-density fluid supplied into the measurement loop, provided that the sump tank is not allowed to run dry; for which purpose a filling port is provided to recharge the sump as necessary for very long measurement traverses.

5. A tube profile gage as defined in claim 4, wherein said means of determining the hydrostatic pressure resulting from the vertical position of the heavy density/light density fluid interface with respect to the fixed elevation of the surface of the heavy density fluid in the cabinet, and of automatically recording and calibrating the hydrodynamic pressure variation produced by the continuously moving fluid interface at a recording time rate proportional to the rate of travel of the said fluid interface through the measurement traverse comprises use of a pressure transducer fitted to the light density fluid side of the measurement traverse, said transducer being one of the class of fluid pressure transducers which afford direct, visual observation of the tube profile gage fluid pressure by means of a digital display of hydrostatic pressure during manual incremental advance of the fluid interface through the measurement traverse, and which are further suitable for driving an instrumentation recorder, said recorder being one of the class of recorders characterized by digital data punch tape units and electric analog strip chart units, which recorders as a class furnish a permanent record of the pressure variable output of the pressure transducer as one scaler quantity of the recorder and the corresponding representative location of the said pressure along the measurement traverse as another, time dependent scaler quantity of the recorder, with calibration of both said scaler quantities verified by means of precise, local rises in vertical elevation of the measurement traverse conduit installed at fixed distances along the traverse.

* * * * *